(12) United States Patent
Castelli et al.

(10) Patent No.: US 6,336,019 B2
(45) Date of Patent: ***Jan. 1, 2002

(54) SURFACE POSITION AND VELOCITY MEASUREMENT FOR PHOTORECEPTOR BELT

(75) Inventors: Vittorio Castelli; Barry Wolf, both of Yorktown Heights; Robert Lofthus, Honeoye Falls, all of NY (US); Harold Anderson, Rancho Palos Verdes, CA (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/450,375

(22) Filed: Nov. 29, 1999

(51) Int. Cl.[7] ............................................. G03G 15/00
(52) U.S. Cl. ..................... 399/162; 347/116; 399/178
(58) Field of Search ................. 399/159, 167, 399/162, 178, 394, 301; 347/116, 154; 226/27, 28, 45; 250/559.29, 559.3, 559.44; 356/399, 400, 401

(56) References Cited

U.S. PATENT DOCUMENTS

| | | | |
|---|---|---|---|
| 4,808,832 A | * 2/1989 | Doggett | ...................... 250/548 |
| 4,916,547 A | 4/1990 | Katsumata et al. | |
| 4,963,899 A | * 10/1990 | Resch, III | ................... 347/116 |
| 5,040,003 A | * 8/1991 | Willis | ......................... 347/118 |
| 5,175,570 A | * 12/1992 | Haneda et al. | .............. 347/116 |
| 5,404,202 A | * 4/1995 | Abramsohn | ................... 399/16 |
| 5,406,359 A | 4/1995 | Fletcher | |
| 5,418,556 A | * 5/1995 | Andrews | .................... 346/116 |
| 6,038,423 A | * 3/2000 | Tagawa et al. | ............. 399/301 |

* cited by examiner

Primary Examiner—Robert Beatty
(74) Attorney, Agent, or Firm—Oliff & Berridge, PLC

(57) ABSTRACT

Systems and methods are provided that improve the registration between the color separation images. The systems and methods control the output of the image data for one or more of the color separation images and the velocity of an image-carrying member to remove or reduce registration offsets based on determined position and velocity of the image-carrying member. A position-determining sensor on an image-carrying member device module is used to determine the process-direction position of the image-carrying member to provide real time motion information by simultaneously sensing a plurality of position-determining marks. A position-determining controller determines the process-direction position of the image-carrying member by detecting the plurality of position-determining marks using the position-determining sensor and averaging or correlating the detected data.

8 Claims, 6 Drawing Sheets

SURFACE POSITION AND VELOCITY MEASUREMENT FOR PHOTORECEPTOR BELT

BACKGROUND OF THE INVENTION

1. Field of Invention

This invention generally relates to methods and systems that determine the position and/or velocity of an image-carrying member.

2. Description of Related Art

Electrophotography, a method of copying or printing documents, is performed by exposing an image representation of a desired original image onto a substantially uniformly charged photoreceptor, such as a belt. In response to that image representation, the charged photoreceptor discharges to create a latent image of the desired original image on the photoreceptor's surface. Developing material, or toner, is then deposited onto the latent image to form a developed image. The developed image is then transferred to a final substrate, such as paper. The surface of the photoreceptor is then cleaned of residual developing material and recharged in preparation for the production of another image.

Color images may be produced by repeating the above process once for each differently colored toner that is used to make a composite color image. For example, in one color imaging process, referred to herein as the Recharge, Expose, and Develop, Image On Image (REaD IOI) process, a charged photoreceptor surface is exposed to an image which represents a first color. The resulting electrostatic latent image is then developed with a first colored toner to form a first color separation image. The charge, expose and develop process is repeated, for example, for a second colored toner, then for a third colored toner, and finally for a fourth colored toner to form second, third and fourth color separation images. The various differently-colored color separation images are placed in superimposed registration with the first developed color separation image so that a desired composite color image results. The composite color image is then transferred and fused onto an image recording substrate or medium.

An alternate type of copying or printing documents utilizes direct marking methods. In this case the inks or toners are directly applied to the image-bearing member. The application may occur by means of ink or toner ejectors that can be selectively actuated by a central image controller. The superposition of the color separations on the image-bearing member occurs in the same manner as it was mentioned above. Likewise, the transfer to paper occurs in the same manner as explained above.

As a further example of color image generation, the individual color separation images can be placed on the image bearing separate from one another. The superposition of the separations can take place on the paper, where they are sequentially transferred.

SUMMARY OF THE INVENTION

Registration offsets in a developed image are undesirable because, if the developed image is transferred to a final substrate without adjusting for the registration offsets, the final transferred image will include the registration offsets. That is, each different color separation image will be slightly out of register, or offset, relative to the other color separation images and/or the receiving substrate.

This invention provides a position-determining sensor on an image-carrying member device module to determine the process-direction position of the image-carrying member to provide real time motion information.

This invention separately provides systems and methods that improve the registration between the color separation images.

This invention separately provides systems and methods that control the output of the image data for one or more of the color separation images and that control the position and velocity of the image-carrying member to remove or reduce registration offsets based on determined position and velocity of the image-carrying member.

This invention separately provides a registration controller for an image-forming device that uses the determined position of the image-carrying member to adjust the image data to reduce or eliminate registration offsets.

In one exemplary embodiment of the systems and methods of this invention, a position-determining controller determines the process-direction position of the image-carrying member by detecting a pattern of position-determining marks using a position-determining sensor and by processing the detected data through averaging or correlation to eliminate detection errors.

These and other features and advantages of the systems and methods of this invention are described in or are apparent from the following detailed description of exemplary embodiments of the invention.

BRIEF DESCRIPTION OF THE DRAWINGS

The invention will be described in relation to the following drawings, in which reference numerals refer to like elements, and wherein.

DETAILED DESCRIPTION OF PREFERRED EMBODIMENTS

Figure 1:
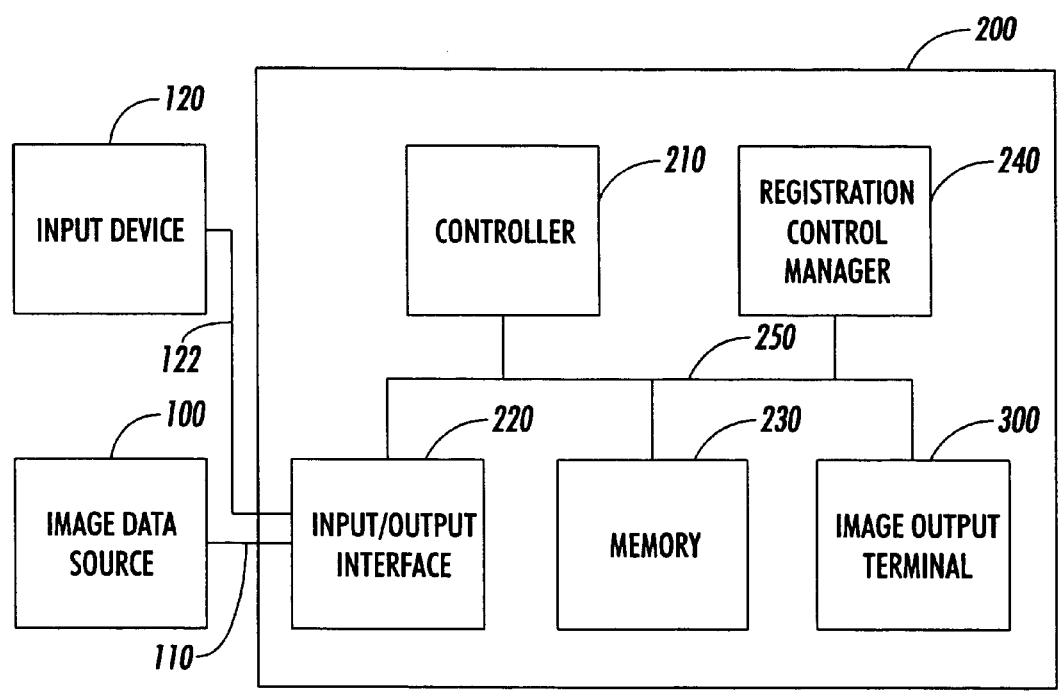
FIG. 1 shows one exemplary embodiment of a functional block diagram of an image processing apparatus that incorporates the registration control systems and methods in accordance with this invention.

FIG. 1 shows one exemplary embodiment of an image processing apparatus 200 incorporating the registration control systems and methods in accordance with this invention. As shown in FIG. 1, an image data source 100 and an input device 120 are connected to the image processing apparatus 200 over links 110 and 122, respectively. The image data source 100 can be a digital camera, a scanner, or a locally or remotely located computer, or any other known or later developed device that is capable of generating electronic image data. Similarly, the image data source 100 can be any suitable device that stores and/or transmits electronic image data, such as a client or a server of a network. The image data source 100 can be integrated with the image processing apparatus 200, as in a digital copier having an integrated scanner. Alternatively, the image data source 100 can be connected to the image processing apparatus 200 over a connection device, such as a modem, a local area network, a wide area network, an intranet, the Internet, any other distributed processing network, or any other known or later developed connection device.

It should also be appreciated that, while the electronic image data can be generated at the time of printing an image from an original physical document, the electronic image data could have been generated at any time in the past. Moreover, the electronic image data need not have been generated from the original physical document, but could have been created from scratch electronically. The image data source 100 is thus any known or later developed device which is capable of supplying electronic image data over the link 110 to the image processing apparatus 200. The link 110 can thus be any known or later developed system or device for transmitting the electronic image data from the image data source 100 to the image processing apparatus 200.

The input device 120 can be any known or later developed device for providing control information from a user to the image processing apparatus 200. Thus, the input device 120 can be a control panel of the image processing apparatus 200, or could be a control program executing on a locally or remotely located general purpose computer, or the like. As with the link 110 described above, the link 122 can be any known or later developed device for transmitting control signals and data input using the input device 120 from the input device 120 to the image processing apparatus 200.

As shown in FIG. 1, the image processing apparatus 200 includes a controller 210, an input/output interface 220, a memory 230, registration control manager 240 and an image output terminal 300, each of which is interconnected by a control and/or data bus 250. The links 110 and 122 from the image data source 100 and the input device 120, respectively, are connected to the input/output interface 220. The electronic image data from the image data source 100, and any control and/or data signals from the input device 120, are input through the input interface 220, and, under control of the controller 210, are stored in the memory 230 and/or provided to the controller 210.

The memory 230 preferably has at least an alterable portion and may include a fixed portion. The alterable portion of the memory 230 can be implemented using static or dynamic RAM, a floppy disk and disk drive, a hard disk and disk drive, flash memory, or any other known or later developed alterable volatile or non-volatile memory device. If the memory includes a fixed portion, the fixed portion can be implemented using a ROM, a PROM, an EPROM, and EEPROM, a CD-ROM and disk drive, a DVD-ROM and disk drive, a writable optical disk and disk drive, or any other known or later developed fixed or non-volatile memory device.

The registration control manager 240 adjusts the control information for the electronic data stored in the memory 230 for each different color subimage, or color separation image, of the electronic image data, and/or the velocity of an image-carrying member based on the current value for registration offset in the image output terminal 300. The registration control manager 240 then outputs adjusted image control signals, which control how the electronic image data is output and/or control the velocity of the image-carrying member, to the image output terminal 300. The registration control manager 240 provides the image processing apparatus 200 with the capability to monitor and adjust the image-on-image color registration while making prints.

While FIG. 1 shows the registration control manager 240 and the image output terminal 300 as portions of an integrated system, the registration control manager 240 could be provided separately from the image output terminal 300. That is, the registration control manager 240 may be a separate device attachable upstream of a stand-alone image output terminal 300.

Figure 2:
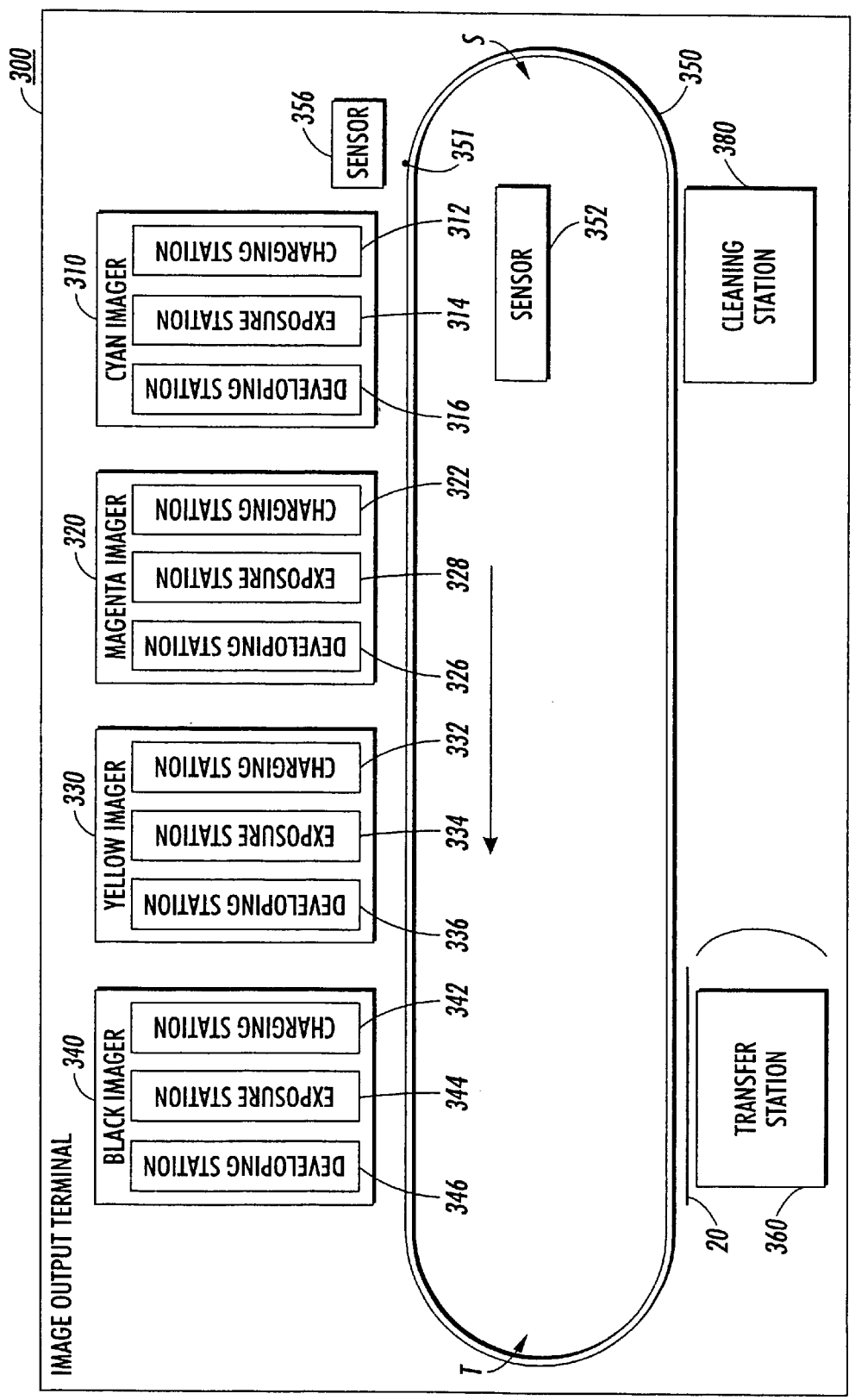
FIG. 2 shows one exemplary embodiment of an output terminal that incorporates the registration control systems and methods of this invention.

For example, the registration control manager 240 and the position-determining sensor 352, as shown in FIG. 2, may be implemented as devices which interface with both the image data source 100 and the hard image output terminal 300. For example, the registration control manager 240 may be software or hardware incorporated into a network print server that forms a portion of the image data source 100 and that receives the sensor signals from the position-determining sensor 352, and controls the output of the image data by the image output terminal 300 and/or controls the velocity of the image-carrying member in the image output terminal 300.

Furthermore, the registration control manager 240 may be implemented as hardware in, or as software executing on, the image processing apparatus 200 and/or the image data source 100. Other configurations of the elements shown in FIGS. 1 and 2 may be used without departing from the spirit and scope of this invention.

FIG. 2 shows one exemplary embodiment of the image output terminal 300 according to this invention. As shown in FIG. 2, the image output terminal 300 includes a plurality of color imagers 310–340, an image-carrying member such as a photoreceptor belt 350, a transfer station 360, and a cleaning station 380. Each of the color imagers 310–340 are located along the length of the photoreceptor belt 350 from a steering end S of the belt 350 to a transfer end T of the belt 350, respectively. In particular, each of the color imagers 310–340 includes a charging station 312, 322, 332, and 342, respectively, an exposure station 314, 324, 334, and 344, respectively, and a developing station 316, 326, 336, and 346, respectively.

It should also be appreciated that while FIG. 2 shows a photoreceptor belt as the imaging carrying member affected by registration offset, the image output terminal 300 may use other imaging substrates. For example, the registration control can be applied with equal effectiveness to a non-photoreceptor image-bearing belt system which builds color image separation layers on a separate photoreceptor and transfers the images to an intermediate belt before transferring the images from the intermediate belt to a final substrate. This intermediate belt system is described on U.S. Pat. No. 5,406,359 to Fletcher, incorporated herein by reference in its entirety.

Alternatively, the registration control can be applied to a transport belt system which forms the images on a separate photoreceptor and transfers the color image separation layers to a final substrate carried by a transport belt. This transfer belt system is described on U.S. Pat. No. 4,916,547 to Katsumata et al., incorporated herein by reference in its entirety. In these systems, the imaging stations can be considered to also include the photoreceptor on which the images are formed and from which the images are transferred.

In the exemplary embodiment shown in FIG. 2, each of the respective charging stations 312–342 of the imagers 310–340 uniformly charges the photoreceptor belt 350 in preparation for forming a latent electrostatic image. In each of the imagers 310–340, each of the respective exposure stations 314–344 exposes the uniformly charged photoreceptor belt 350 to form the latent image on the photoreceptor belt 350. Then, in each of the imagers 310–340, each of the respective developing stations 316–346 applies toner of a different color to develop the latent image formed on the photoreceptor belt 350 using the differently-colored toner.

It should be appreciated that each of the exposure stations 314–344 may be implemented using any known or later developed device for forming a latent image on the photoreceptor belt 350. For example, the exposure stations 314–344 could be a rotating polygon raster output scanner (ROS), a full width printbar containing light emitting diodes, laser diodes, organic light emitting diodes, or the like.

A position-determining sensor 352 outputs position data in accordance with detected position-determining marks on the photoreceptor belt 350 that can be detected by the position-determining sensor 352. The registration control manager 240 then determines the amounts of the one or more registration offsets based on the position data output by the position-determining sensor 352, at the belt positions corresponding to the various positions where the exposure stations 314–344 are writing the latent images on the photoreceptor belt 350.

Based on the registration offsets at the writing positions of each of the exposure stations 314–344 determined by the registration control manager 240, the registration control manager 240 modifies the image control signals that control the output of the imager data by at least three of the imagers 310–340, and/or a motor that controls the velocity of the photoreceptor belt 350, so that the latent images written by each of the exposure stations 314–344 will be substantially aligned. Accordingly, when the latent images formed at the exposure stations 314–344 are developed at the corresponding ones of the developing stations 316–346, the resulting color separation images, or layers, formed by each of the imagers 310–340 will be substantially aligned with each other. This tends to minimize, or at least reduce, the misregistration between the various color separation images formed by the imagers 310–340. The positions of the various color separation images on the photoreceptor belt 350 will be adjusted in several dimensions to achieve appropriate alignment accuracy.

The resulting color separation images, or layers, formed by each of the imagers 310–340 can also be substantially aligned with a desired position on the receiving substrate 20. Accordingly, when the resulting color separation images, or layers, are transferred onto the receiving substrate 20 at the transfer station 360, the resulting color separation images, or layers, formed by each of the imagers 310–340 will be substantially aligned with the desired position on the receiving substrate 20. This minimizes or at least reduces, for example, any misregistration between the various color separation images, or layers, formed by the imagers 310–340 and any other images on the receiving substrate 20.

Figure 3:
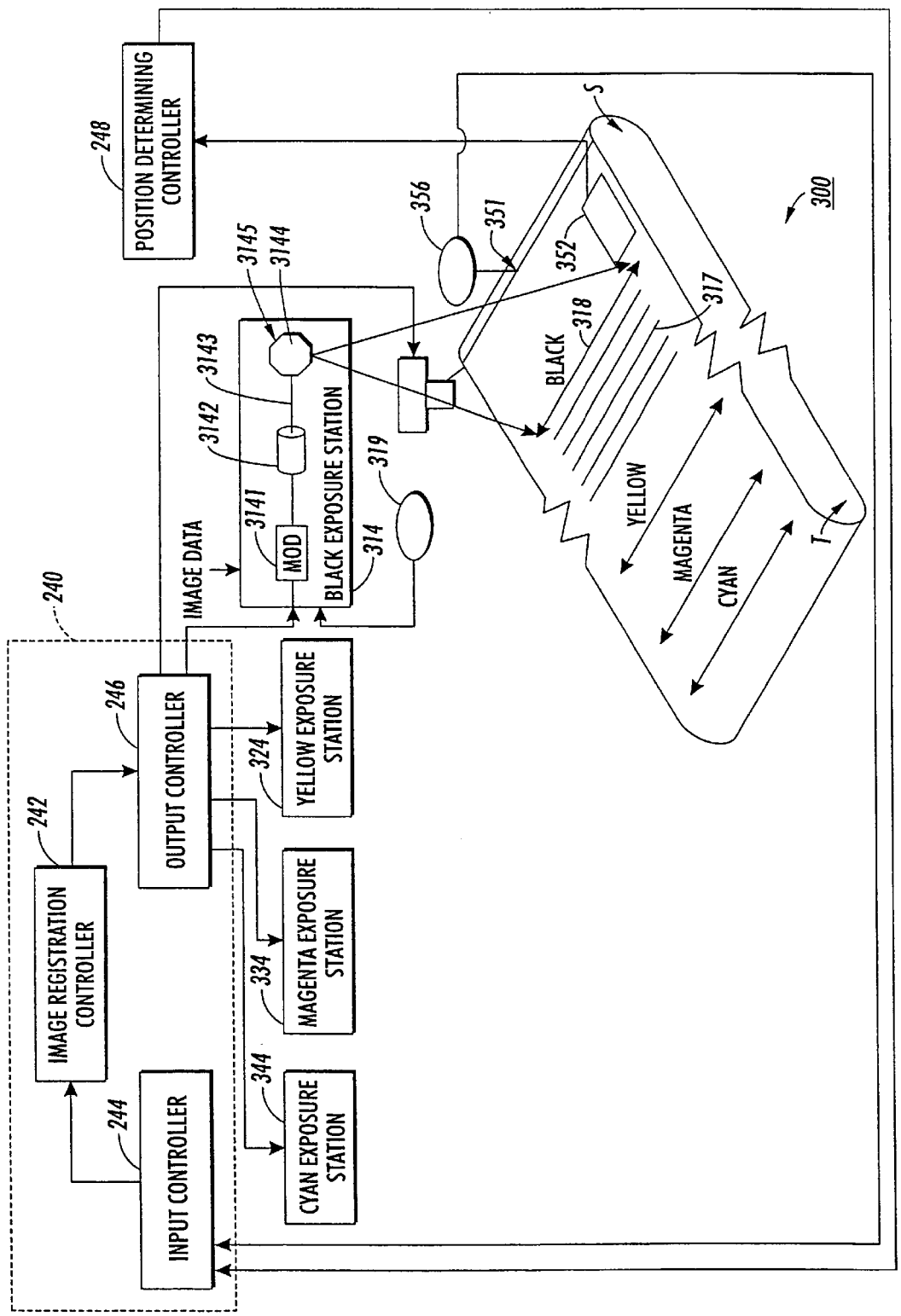
FIG. 3 shows in greater detail the image-carrying member shown in FIG. 2 and one exemplary embodiment of the registration control system of FIG. 1 in accordance with this invention.

The image output terminal 300 includes a position-determining sensor 352 that detects the position-determining marks on the photoreceptor belt 350 and that outputs the sensed results to the position-determining controller 248 shown in FIG. 3. The position-determining controller 248 outputs position-determining signals indicative of the instantaneous process-direction position of the photoreceptor belt 350 over the control and/or data bus 250 to the registration control manager 240.

A seam sensor 356 outputs a seam signal over the control and/or data bus 250 to the registration control manager 240. The seam signal indicates when the seam 351 of the photoreceptor belt 350 arrives at a predetermined position. The position-determining controller 248 outputs a position-determining signal to the registration control manager 240. Using the position-determining signal, the registration control manager 240 is able to determine the actual amount of movement of the photoreceptor belt 350 in the process direction since the seam signal last indicated the arrival of the seam 351 at the predetermined position. Thus the registration control manager 240 is able to determine the instantaneous position of the photoreceptor belt 350 along the process direction.

FIG. 3 shows in greater detail one exemplary embodiment of the image output terminal 300 shown in FIG. 2 and the registration control manager 240 shown in FIG. 1. As shown in FIG. 3, in this exemplary embodiment of the image output terminal 300, each of the imagers 310–340 are implemented using a raster output scanner to expose the photoreceptor belt 350. As shown in FIG. 3, each of the exposure stations 314–344 includes a modulator 3141 that modulates one or more light beams based on the input image data. A light emitting device 3142 is connected to the modulator 3141 and emits the at least one light beam 3143 modulated by the modulator 3141. Each light beam 3143 emitted by the light emitting device 3142 is imaged onto a facet 3145 of a rotating polygon 3144 by a set of input optics (not shown). Each light beam reflected from the current facet 3145 of the rotating polygon 3144 is imaged onto the photoreceptor belt 350 using a set of output optics (not shown).

It should be appreciated that the image output terminal 300 can use any other known or later developed imager. Such imagers include, but are not limited to, LED bars or linear arrays of exposure devices.

As shown in FIG. 3, a particular color image separation layer 317 formed on the photoreceptor belt 350 comprises a plurality of scanlines 318. Each scanline 318 has a beginning point and an ending point. The beginning point, or "start of scan" point, is the point at which the current facet 3145 of the rotating polygon mirror 3144 directs each of the one or more light beams 3143 onto an appropriate portion of the photoreceptor belt 350 such that image data can be recorded. A start of scan sensor 319 senses when the one or more light beams are at the "start of scan" point. Each start-of-scan sensor 319 independently determines the "start of scan" point for the corresponding exposure station and independently provides suitable feedback signals to the corresponding one of the exposure stations 314–344. The feedback signals from the start-of-scan sensors 319 to the imagers 310–340 indicate the position of the one or more light beams 3143 on the photoreceptor belt 350. The feedback signal from a particular start-of-scan sensor 319 are input to the modulator 3141 of the corresponding one of the exposure stations 314–344 of the imagers 310–340. The feedback signals from the start-of-scan sensors 319 can be used to control the lateral margin position of the scanlines 318.

The registration control manager 240, based on the current value for the registration offset of the photoreceptor belt 350, generates, for each imager 310–340, an imager-specific control signal used by the corresponding modulator 3141. Using the appropriate control signal, the corresponding one of the exposure stations 314–344 determines, in response to receiving the start-of-scan signal from the corresponding start-of-scan sensor 319, when to begin modulating the one or more light beams 3143 based on the image data for the current scanline. That is, based on the timing control signals from the registration control manager 240 and the feedback signals from the start-of-scan sensor 319, each modulator 3141 begins modulating its light beam 3143 based on the image data for the current scanline at a point in time which eliminates the registration offsets. The modulated light beam 3143 is then emitted by the light emitting device 3142 and is imaged onto a facet 3145 of a rotating polygon 3144.

As shown in FIG. 3, the image registration control manager 240 includes an image registration controller 242, an input controller 244, an output controller 246, and a position-determining controller 248. The input controller 244 receives the position-determining signals output from the position-determining controller 248.

It should be appreciated that each of the elements 210–248 shown in FIGS. 1–3 can be implemented as portions of a suitably programmed general purpose computer. Alternatively, each of the elements 210–248 shown in FIGS. 1–3 can be implemented as physically distinct hardware circuits within an ASIC, or using a FPGA, a PDL, a PLA or a PAL, or using discrete logic elements or discrete circuit elements. The particular form each of the elements 210–248 shown in FIGS. 1–3 will take is a design choice and will be obvious and predictable to those skilled in the art.

The position-determining controller 248 outputs position-determining signals to the input controller 244 in accordance with the detected position signal from the position-determining sensor 352. The seam sensor 356 senses the arrival of the seam 351 on the photoreceptor belt 350 and outputs a seam sensor signal to the input controller 244.

Upon the seam sensor signal indicating the arrival of the seam 351 at the predetermined position, the position-determining signals from the position-determining controller 248 are input to the input controller 244. The position-determining signals are used by the registration controller 242 to determine the instantaneous process-direction position of the photoreceptor belt 350. The instantaneous process-direction position of the photoreceptor belt 350 is determined as the seam of the photoreceptor belt 350 travels from the steering end S to the transfer end T and back around to the steering end S. The registration controller 242 determines the actual lateral movement of the photoreceptor belt 350 based on the determined position of the photoreceptor belt 350 at the position-determining sensor 352 relative to the position of the seam 351.

The registration controller 242 determines the required amount of displacement from the belt position determined by the position-determining sensor 352 to the various positions where the exposure stations 314–344 are writing the latent color separation images on the photoreceptor belt 350 to ensure proper image registration.

The resulting color separation images, or layers, formed by each of the imagers 310–340 can also be substantially aligned with a desired position on the receiving substrate. In this case, when the resulting color separation images, or layers, are transferred onto the receiving substrate 20 at the transfer station 360, the resulting color separation images, or layers, formed by each of the imagers 310–340 will be substantially aligned with the desired position on the receiving substrate 20. This minimizes, for example, any misregistration between the various color separation images, or layers, formed by the imagers 310–340 and any other images on the receiving substrate 20.

The registration controller 242 determines the actual process-direction positions of the photoreceptor belt 350 during a print run based on the position-determining signals from the position-determining controller 248. The registration controller 242 then determines the registration offset from those determined process-direction positions of the belt. Based on the determined registration offsets, the image adjustments to be made at the positions of the images 310–340, the adjustments to the drive signal for the motor that drives the photoreceptor belt 350 and/or the adjustments to be made to the lateral paper registration are determined. The registration controller 242 continues to determine the instantaneous registration offsets throughout the print run to keep the images registered. That is, the registration controller 242 will monitor and control image registration by sensing position-determining marks with the position-determining sensor 352, and will output adjusted image control signals to the exposure stations 314-344 and/or to the drive motor of the photoreceptor belt 350, based on the determined position signals from the position-determining sensor 352.

Figure 4:
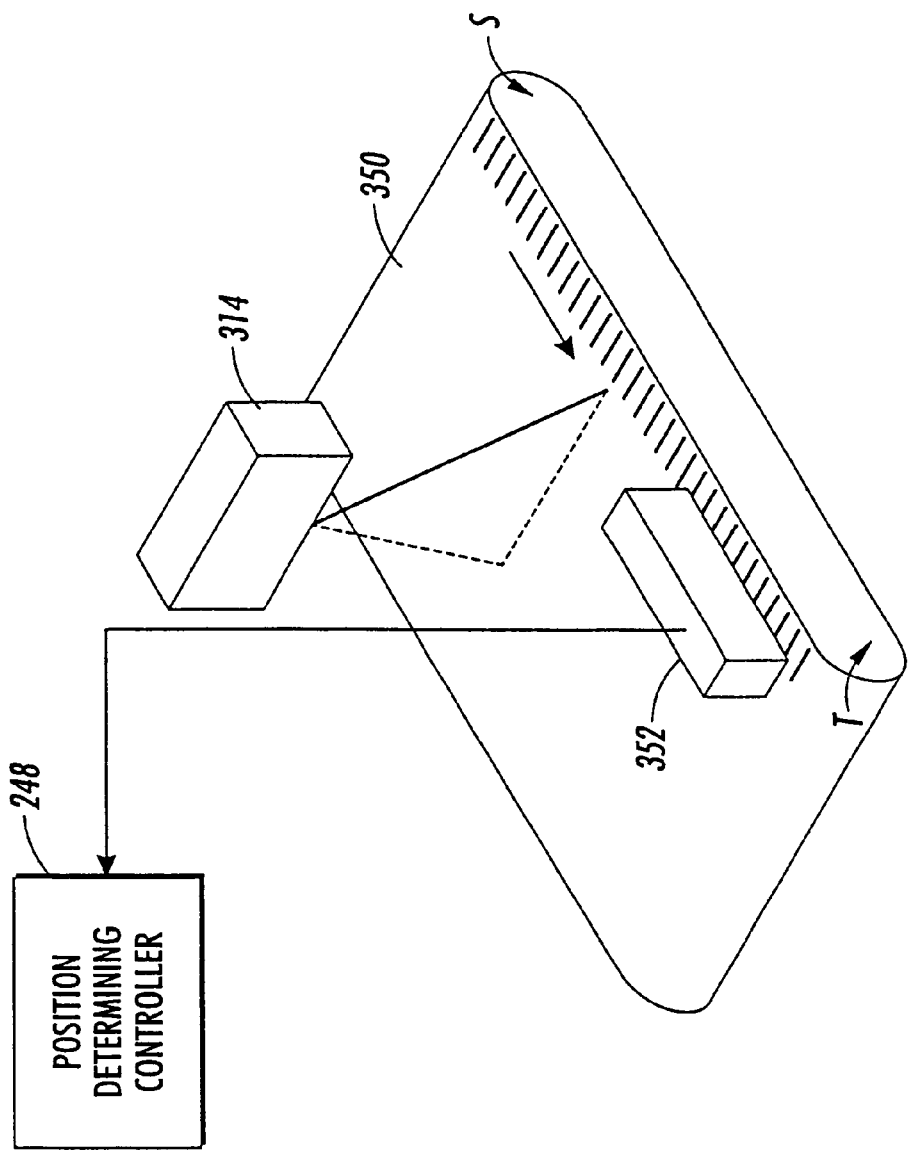
FIG. 4 shows in greater detail one exemplary embodiment of the position-determining sensor provided for position determination shown in FIG. 3.

FIG. 4 shows one exemplary embodiment of the position-determining sensor 352 and the sensed position-determining marks. As shown in FIG. 4, the position-determining sensor 352 is used to collect data from the position-determining marks on the photoreceptor belt 350. In this exemplary embodiment, a pattern of position-determining marks is provided along an edge of the photoreceptor belt 350. These position-determining marks can be any predetermined features provided on the photoreceptor belt 350 during the fabrication of the belt, including, but not limited to, holes punched into the belt, indentations in, or other detectable embossed features on the belt, ink or toner markings on the belt, and the like.

It should be appreciated that any markings which provide sufficient position determination data to the position-determining sensor 352 may be used as the position-determining markings. It should also be appreciated that the position-determining marks and the spaces between the marks need not be highly accurately placed on the photoreceptor belt 350. Thus, the position-determining marks may be produced on the photoreceptor belt 350 by timing the mark forming process while the photoreceptor belt is moved with good, but not demanding, speed control during production of the photoreceptor belt 350. The marking is initiated, for example, after a seam on the photoreceptor belt 350 is sensed, and ceases just before the seam is about to be sensed again.

It should additionally be appreciated that the size of the marks in the lateral direction, i.e., across the belt relative to the direction of belt movement, could be any size that is sufficiently large enough to be within the capture range of the belt position-determining sensor 352.

In one exemplary embodiment of the systems and methods of this invention, a CCD array is used as the position-determining sensor 352. In this exemplary embodiment, operating the CCD array, as the position-determining sensor 352 in a binary mode, an electric charge threshold is set for the CCD array so that, if more than a certain amount of light is imaged on a particular CCD array element, a charge larger than the threshold value is generated and a digital value 1 is assigned to the signal value output by that CCD array element. Alternatively, if less light that the threshold amount falls on that CCD array element, a digital value 0 is assigned to the signal value output by that CCD array element. Each transition from a 1 to a 0 or from a 0 to a 1 denotes the position of an edge of a position-determining mark.

In various exemplary embodiments of the systems and methods of this invention, the position-determining controller 248 determines the particular location of a position-determining mark by averaging the position-determining data received from a plurality of the position-determining marks detected by the position-determining sensor 352 and/or correlating the position-determining data received from a plurality of the position-determining marks detected by the position-determining sensor 352. In these exemplary embodiment, the accuracy in determining the position of the position-determining marks is within acceptable values. That is, the error is minimal and within values predetermined to be acceptable.

In these exemplary embodiments, the accuracy is determined by comparing first position-determining data in the captured range of the belt position-determining sensor 352 at a given time to second position-determining data in the captured range of the belt position-determining sensor 352 taken at a later time, where particular position-determining marks have traveled from a first position to a second position in the two captured ranges. That is, because the photoreceptor belt 350 is continuously moving during the printing process, the position-determining marks on the photoreceptor belt 350 also move. Thus, the position-determining marks within the captured range of the belt position-determining sensor 352 would be in different locations at various times. By knowing the approximate belt velocity, the positions of the particular position-determining marks are also known.

In an exemplary embodiment incorporating the averaging technique of the systems and methods of this invention, the position-determining sensor 352 may include 2048 CCD array elements, where each CCD array element is 14 $\mu$m in length. The CCD array elements are positioned relative to each other at a center-to-center spacing of 14 $\mu$m. Each mark has a nominal width of 500 $\mu$m. The marks are positioned relative to each other at a center-to-center spacing of 1000 $\mu$m. The CCD array has a cycle time of 0.002 seconds. The photoreceptor belt 350 has an approximate belt velocity of 200 mm/sec. For an exemplary embodiment having these dimensions, in comparing the first position-determining data of the captured range of the CCD array taken at an initial period to the second position-determining data taken 0.002 seconds later, a position-determining mark travels a nominal distance of 400 $\mu$m. With each 500 $\mu$m wide mark positioned relative to each other at a center-to-center spacing of 1000 $\mu$m, the edges of the nearest neighboring marks are 500 $\mu$m from each side of the next position-determining mark. Each determination of the two neighboring position-determining marks would have an accuracy of ±7 $\mu$m, which is half the length of a CCD array element. If 28 position-determining marks were determined to be in one length of the position-determining sensor 352, and 24 of the 28 position-determining marks are determined to be within the sensor length 0.002 seconds later, using the mean error formula, the mean error resulting from the averaging of the sensed results becomes ±7 $\mu$m/$24^{0.5}$, or ±1.43 $\mu$m.

The velocity of the photoreceptor belt 350 is determined on the basis of distance differences of the position-determining marks after a plurality of determinations. In the above described case, for a travel distance of 400 $\mu$m, the determining error is ±1.43 $\mu$m, or the velocity accuracy is 3 parts in 1000, which is within the acceptable value. By increasing the number of position-determining marks from 28 to 96, i.e., by a factor of 4, the determination error can be reduced from ±1.43 $\mu$m to ±7 $\mu$m/$96^{0.5}$, or ±0.714 $\mu$m. The velocity accuracy is then improved to less than 1 part in 10,000. Since random errors are introduced into the pattern of position-determining marks during manufacture of the photoreceptor belt 350, errors for each determination are random and uncorrelated. The mean error resulting from averaging the errors is determined without relying on the accuracy of the marks, the space between the marks, or any aberration of the edges of the marks. By increasing the number of marks, the determination error may be reduced.

Alternatively, in another exemplary embodiment of the systems and methods of this invention, the controller 248 determines the particular location of a position-determining mark by correlating a plurality of the position-determining marks detected by the position-determining sensor 352. In an exemplary embodiment of the correlation technique of the systems and methods of this invention, displacement of the photoreceptor belt 350 between two adjacent time periods is taken to be displacement that maximizes the correlation between the pattern detected by the position-determining sensor 352 at each of these time periods. That is, maximum correlation occurs when the pattern directly overlaps. The resolution with which the displacement can be determined depends on the pattern of position-determining marks on the belt 350. In this exemplary embodiment, a pattern in which each run of consecutive 0's or 1's is a multiple N of the width of the position-determining sensor 352 plus a random number which is uniformly distributed in from 0 to the sensor width, N being a randomly selected number.

In this exemplary embodiment, the correlation is performed by a coarse correlation and a fine correlation. The coarse correlation is performed by the values of N, and fine correlation is performed by the random number that is between 0 and the sensor width. That is, the coarse correlation is performed with step sizes of the sensor width while the fine correlation is performed with step sizes of a fraction of the sensor width.

As the photoreceptor belt 350 moves from a first position to an adjacent position, a position increment is added to a register. As the photoreceptor belt 350 moves further to the next adjacent position, an additional increment is added to the register. The particular locations of the position-determining marks are determined by correlating the plurality of the positions. The velocity of the photoreceptor belt 350 is determined based on the distance difference after a plurality of determinations.

In the exemplary embodiments discussed above, the accumulated error in determining a current position is no greater than the error in determining a single position. That is, the error is always within half the size of the CCD array element. Thus, error in sensing of a first determination and error in sensing of a second determination are not cumulative.

Figure 5:
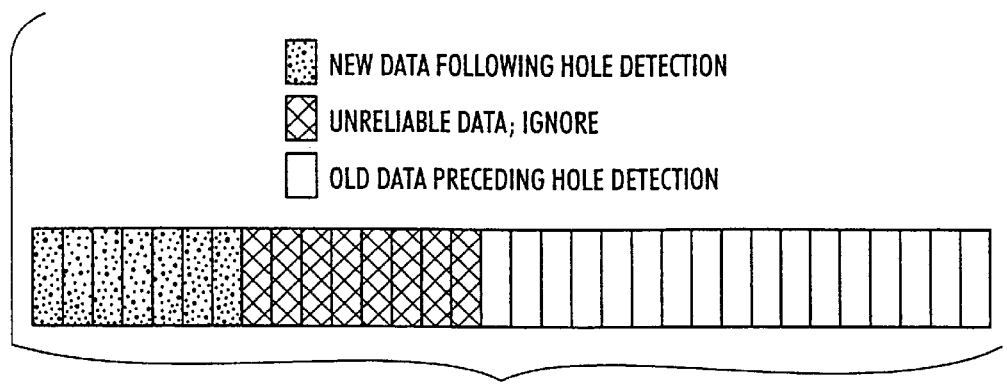
FIG. 5 shows in greater detail the data obtained by the position-determining sensor in FIG. 4.

As shown in FIG. 5, the passing of a position-determining mark enables the position-determining sensor 352 to treat the position-determining data in each captured range of the position-determining sensor 352 as three different types of values, i.e., new data, unreliable data and old data. The unreliable data is ignored and the location of such ignored data is tracked to the right to a new position in the captured range of the position-determining sensor 352 after each determination. Both the old data preceding data capture and the new data following each determination are valid, and may be used to determine incremental changes in position. The timing for each determination is resynchronized by re-synchronizing the illumination time to occur at a fixed time after each data capture and resetting the position register to zero.

Re-synchronization is also done using a correlation pattern, for example. In various exemplary embodiments, a correlation pattern is produced in the position-determining mark at the beginning and at the end of the rotation of the photoreceptor belt 350. The correlation pattern is then sensed by the sensor 352 to establish re-synchronization.

The cycle time of the sensor 352 is the time each CCD array element in the sensor takes to integrate the light and the time the position-determining sensor 352 takes to shift the data out of the CCD array. The integration step and the shifting steps are done in parallel and the slower one controls the minimum cycle time.

Since the velocity and cycle time are known, the location of the next transition can be predicted. Logic is employed to accept new data only if one and only one transition exists within a given window. By performing this predictive windowing, detection of false 1's and 0's can be avoided.

The velocity of the photoreceptor belt 350 is determined from the repetitive position information and the elapsed time between determinations. Instantaneous current position may be determined from the previous position and the current velocity.

The position-determining controller 248 outputs the determined position signals to the image registration control manager 240. The image registration control manager 240 controls the output of image data and/or the velocity of the photoreceptor belt 350 during the print run using the data output from the position-determining controller 248. During the print run, the registration control manager 240 will monitor and control image registration and output adjusted image control signals to the exposure stations 314–344 and the drive motor of the photoreceptor belt 350.

It should be appreciated that though FIG. 4 shows the position-determining sensor 352 as a CCD array, any known or later developed mechanism, device or structure that may be used to sense a pattern of position-determining marks may be applied as the position-determining sensor 352, for example.

As described above, using the position-determining sensor 352, the registration controller 242 can determine the position of the photoreceptor belt 350 relative to the seam 351. Once the registration control is configured for a given belt, the registration controller 242 may be implemented to automatically scale to accommodate various photoreceptor belt velocities.

Knowing the position of the photoreceptor belt 350 along the process direction enables efficient registration control. Because the registration controller 242 can determine the process-direction position of the photoreceptor belt 350 relative to the seam 351, by using the process-direction position obtained from the position-determining sensor 352, registration control can be performed.

Figure 6:
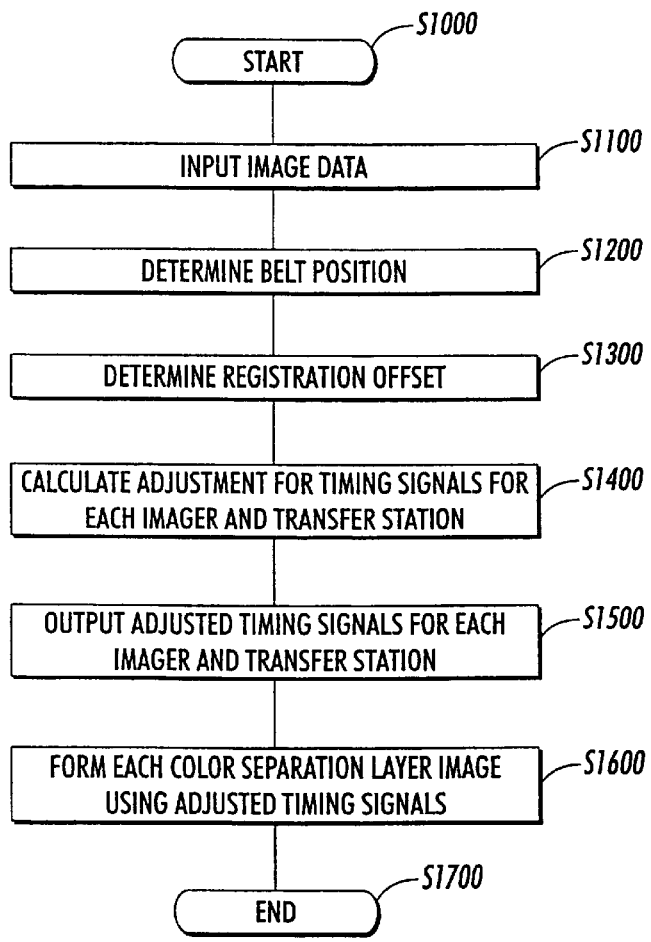
FIG. 6 is a flowchart outlining one exemplary embodiment of the registration control methods according to this invention.

FIG. 6 is a flowchart outlining one exemplary embodiment of the method for image registration control according to this invention. Beginning at step S1000, control continues to step S1100, where the electronic image data is input. Next, in step S1200, the instantaneous position of the photoreceptor belt is determined. Then, in step S1300, the determined belt positions are compared to each other to determine one or more instantaneous registration offset. In particular, the instantaneous registration offsets include the difference between the sensed belt positions. Control then continues to step S1400.

In step S1400, based on the one or more determined registration offsets, the image data adjustments and the substrate registration data adjustment are determined to ensure the images remain registered with each other and with the receiving substrate. That is, the image data for each color separation layer is adjusted and the substrate registration adjusted, so that any displayed or printed image created based on the adjusted image data will appear with any registration offsets reduced, if not either minimized or eliminated. Then, in step S1500, the adjusted image data for each color separation layer, and/or an adjusted belt velocity control signal, is output. Next, in step S1600, each color separation layer image is formed by the appropriate imager using the adjusted data and/or with the belt moving as the adjusted belt velocity. Control then continues to step S1700, where the control routine ends.

Figure 7:
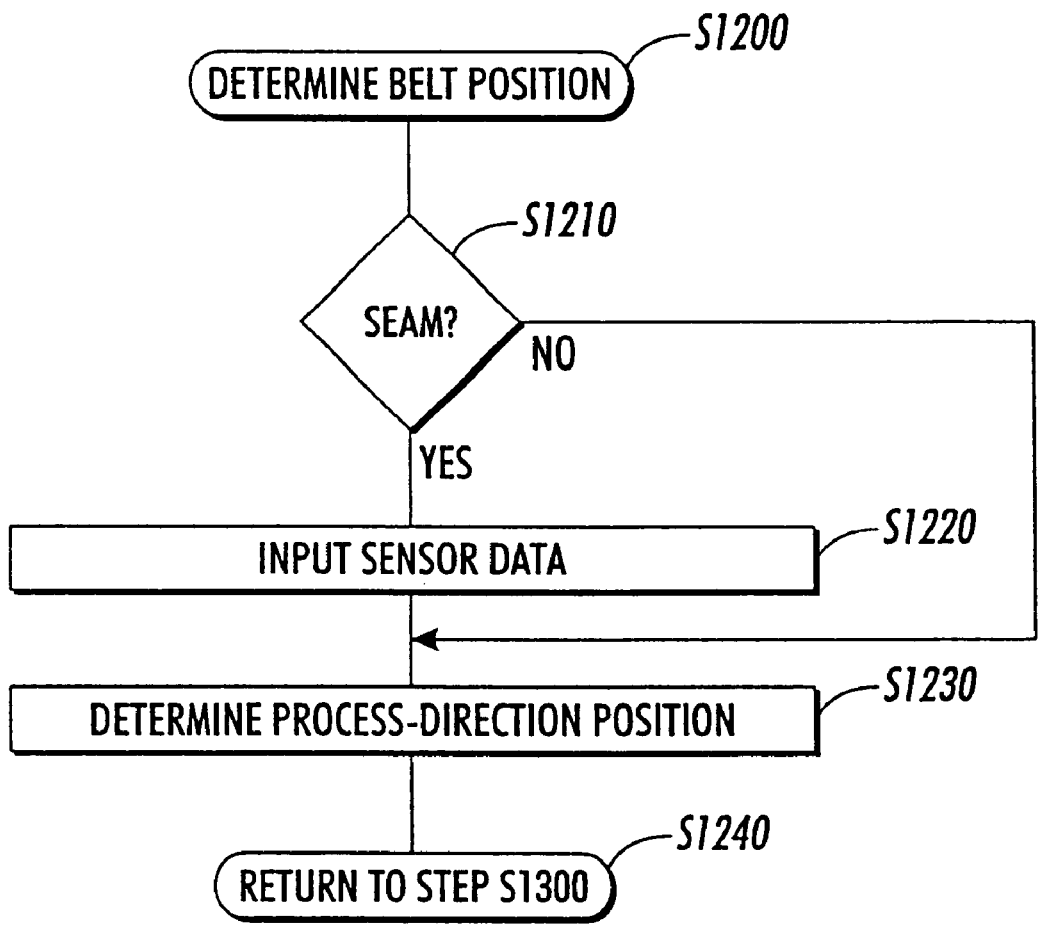
FIG. 7 is a flowchart outlining one exemplary embodiment of the belt position-determining method of FIG. 6.

FIG. 7 is a flowchart outlining in greater detail one exemplary embodiment of the method for determining the instantaneous belt position of step S1200. Starting in step S1200, control continues to step S1210, where a determination is made whether the seam has been detected. If the seam is not detected, control continues to step S1220. Otherwise, control jumps directly to step S1230.

In step S1220, the data from the position-determining sensor is input. Then, in step S1230, the data from the position-determining sensor is converted to a process-direction belt position. That is, the data is averaged or correlated with previous measurements to obtain the process-direction belt position. Control then continues to step S1240, where control returns to step S1300.

As shown in FIG. 1, the image processing apparatus 200 is preferably implemented on a programmed general purpose computer. However, the image processing apparatus 200 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, which is capable of implementing the finite state machine that is in turn capable of implementing the flowcharts shown in FIGS. 6–7, can be used to implement the image processing apparatus 200.

This invention has been described in connection with the preferred embodiments. However it should be understood that there is no intent to limit the invention to the embodiments described above. On the contrary, the intent to cover all alternatives, modification, and equivalents as may be included within the spirit and scope of the invention.

For example, it is to be appreciated that this invention need not only be used to determine position and velocity of an image-carrying member. Thus, it should be appreciated that various other modifications and changes may occur to those skilled in the art without departing from the spirit and scope of this invention. Likewise, lateral sampling based on belt position can be applied to any dynamic belt system, not just a xerographic system.

What is claimed is:

1. An image forming device, comprising:
    an image carrying member having a plurality of position determining marks;
    a sensor provided adjacent to the image carrying member that simultaneously senses a plurality of said plurality of position determining marks to determine a measured position value; and
    a position determining circuit that determines an instantaneous position of the image carrying member along a process direction by at least one of averaging and correlating a plurality of the measured position values output by the sensor at different times.

2. The image forming device of claim 1, further comprising a velocity determining circuit that determines a velocity of the image carrying member along a process direction based on the determined instantaneous position of the image carrying member.

3. The image forming device of claim 1, further comprising a seam sensor provided adjacent to the image carrying member that indicates when a seam of the image carrying member arrives at a predetermined location.

4. The image forming device of claim 3, wherein the position determining circuit determines movement of the image carrying member in the process direction since arrival of the seam at the predetermined location.

5. A method for operating an image forming device having an image carrying member having a plurality of position determining marks, the method comprising:

outputting a measured position value by simultaneously sensing a plurality of said plurality of position determining marks with a sensor; and determining an instantaneous position of the image carrying member along a process direction by at least one of averaging and correlating a plurality of the measured position values output by the sensor at different times.

6. The method of claim 5, further comprising determining a velocity of the image carrying member along the process direction based on the determined instantaneous position of the image carrying member.

7. The method of claim 5, further comprising indicating when a seam of the image carrying member arrives at a predetermined location.

8. The method of claim 5, further comprising determining movement of the image carrying member in the process direction since arrival of the seam at the predetermined location.

* * * * *